US012054120B2

(12) United States Patent
Madu

(10) Patent No.: US 12,054,120 B2
(45) Date of Patent: Aug. 6, 2024

(54) ELECTRONIC STORAGE AND MULTIMEDIA BOX DEVICE FOR VEHICLES

(71) Applicant: Sharlene Gean Madu, Katy, TX (US)

(72) Inventor: Sharlene Gean Madu, Katy, TX (US)

(*) Notice: Subject to any disclaimer, the term of this patent is extended or adjusted under 35 U.S.C. 154(b) by 0 days.

(21) Appl. No.: 18/331,619

(22) Filed: Jun. 8, 2023

(65) Prior Publication Data

US 2023/0406214 A1 Dec. 21, 2023

Related U.S. Application Data

(60) Provisional application No. 63/368,770, filed on Jul. 18, 2022, provisional application No. 63/366,638, filed on Jun. 19, 2022.

(51) Int. Cl.
*B60R 7/06* (2006.01)
*B60R 11/00* (2006.01)
*B60R 11/02* (2006.01)
*E05B 81/78* (2014.01)
*E05B 83/28* (2014.01)
*B60R 7/08* (2006.01)

(52) U.S. Cl.
CPC ............ *B60R 7/06* (2013.01); *B60R 11/0217* (2013.01); *E05B 81/78* (2013.01); *E05B 83/28* (2013.01); *B60R 7/087* (2013.01); *B60R 2011/0005* (2013.01)

(58) Field of Classification Search
CPC ...... B60R 7/06; B60R 2011/005; B60R 7/087
USPC ............................ 224/483, 277, 569; 109/52
See application file for complete search history.

(56) References Cited

U.S. PATENT DOCUMENTS

| 2,931,489 | A | * | 4/1960 | Farnholtz | B60N 3/002 224/277 |
| 4,105,246 | A | * | 8/1978 | Trumbull | B60R 7/06 296/97.7 |
| 4,170,324 | A | * | 10/1979 | Stubbings | B60R 11/02 224/279 |
| 4,577,788 | A | * | 3/1986 | Richardson | B60R 7/08 D6/406.3 |
| 6,672,622 | B2 | * | 1/2004 | Barron | B42D 5/005 281/51 |
| RE38,748 | E | * | 6/2005 | Ritter | B42D 5/005 D19/78 |
| D741,598 | S | * | 10/2015 | Calero | D3/303 |
| 9,530,266 | B2 | * | 12/2016 | Delattre | G07C 9/00912 |

(Continued)

*Primary Examiner* — Justin M Larson
(74) *Attorney, Agent, or Firm* — Barry Choobin; Patent 360

(57) ABSTRACT

An electronic storage box device that can be mounted on top of a dashboard of a vehicle, and can be opened quickly by a driver of the vehicle or a person standing outside the vehicle through a window of the vehicle. The electronic storage box device has a compartment for storing at least documents related to the vehicle including a driving license. Such documents can be retrieved by the driver while the hands remain visible to an officer or can be retrieved by the officer himself. The electronic storage box device also includes an audio playback feature, a video camera-based intrusion prevention feature, GPS, Wireless capabilities and a UV radiation feature for sterilizing items in the compartment. The device supports cellular, Wi-Fi, and Bluetooth® capabilities. The device can be retrofitted or installed at the time of manufacturing.

15 Claims, 11 Drawing Sheets

(56) References Cited

U.S. PATENT DOCUMENTS

| | | | |
|---|---|---|---|
| 9,917,454 B2* | 3/2018 | Parlow | B60R 7/06 |
| 10,233,687 B2* | 3/2019 | Delattre | G07C 9/00912 |
| 10,253,529 B1* | 4/2019 | McGinn | E05B 35/00 |
| 10,783,726 B1* | 9/2020 | Samuel | G07C 9/00912 |
| 11,140,917 B2* | 10/2021 | Neal | A24F 15/08 |
| 11,436,844 B2* | 9/2022 | Carruthers | H04N 7/181 |
| 11,479,168 B2* | 10/2022 | Vorac | B60Q 3/68 |
| 11,753,849 B2* | 9/2023 | Fisher | G07C 9/00896 |
| | | | 70/63 |
| 2010/0171020 A1* | 7/2010 | Canino | B60R 11/00 |
| | | | 248/346.03 |
| 2016/0123701 A1* | 5/2016 | Ho | E05C 9/02 |
| | | | 70/63 |
| 2019/0069731 A1* | 3/2019 | Arnold | B65D 83/0894 |
| 2019/0211607 A1* | 7/2019 | Delattre | G07C 9/00912 |
| 2019/0266824 A1* | 8/2019 | Jeruchim | E05B 65/52 |
| 2023/0173989 A1* | 6/2023 | Fitzsimons | B62D 43/10 |
| | | | 224/483 |

* cited by examiner

ELECTRONIC STORAGE AND MULTIMEDIA BOX DEVICE FOR VEHICLES

CROSS-REFERENCE TO RELATED APPLICATIONS

This application claims priority from a U.S. Provisional Patent Application Ser. No. 63/368,770, filed on Jul. 18, 2022, and a U.S. Provisional Patent Application Ser. No. 63/366,638, filed on Jun. 19, 2022, the disclosures of both are incorporated herein by reference in their entirety.

FIELD OF INVENTION

The present invention relates to an electronic storage and multimedia box device for vehicles, and more particularly, the present invention relates to a dashboard mountable electronic storage box device.

BACKGROUND

In automobiles with cabins, a glove box is standard for storing articles. The glove compartment, or glove box, is a compartment built into the dashboard of automobiles and is often used for miscellaneous storage like auto insurance cards, auto registration, emergency cards, and other miscellaneous items. People also often put legal documents related to the vehicle, such as registration and insurance documents, in a wallet. A traditional wallet is a folding pocketbook with compartments for personal papers and usually in unfolded form. A wallet is usually a flexible folding case for carrying specific items, such as driver's licenses, concealed carry licenses, credit cards, money, pictures, and other flat objects, that can be carried in a pocket.

Although there are provisions to safely keep the vehicle documents, when a person is stopped by an officer in a routine traffic stop and is asked to provide certain information to the officer, like the driver's license, auto registration, auto insurance card, concealed carry license, etc., the person, at the same time, is advised by the officer to keep their hands visible to the officer. The driver, however, has to fetch the documents from the glove box or their wallet, and the hands are not visible to the police officer while fetching the documents. Such situations, i.e., the retrieval of the documents to show to the officer from the glove box or wallet can sometimes create a nervous, uncomfortable, and scary interaction between the driver and the officer.

A need is therefore appreciated for an alternative to a wallet and the glove box for a vehicle that overcomes the aforesaid problems.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a dashboard mountable storage box device for storing vehicle-related documents.

It is another object of the present invention that the storage box device is portable.

It is still another object of the present invention that the device supports multimedia playback.

It is yet another object of the present invention that the device has ample storage.

It is a further object of the present invention that the device can be opened and accessed by a person from outside the vehicle through a window of the vehicle.

In one aspect, disclosed is an electronic storage box device and a method of use thereof for storing articles and documents in a vehicle. The electronic storage box device includes a housing having a side wall, a base, and an open top, a lid coupled to the housing through a hinge joint and configured to close the open top, the lid configured to switch between an open state and a closed state, and a compartment within the housing and configured to store at least documents related to the vehicle. The electronic storage box device can be mounted on top of a dashboard of the vehicle. The electronic storage box device further includes a playback module configured to play audio files, the playback module disposed within the housing, and one or more speakers mounted in the housing, the one or more speakers operably coupled to the playback module. The electronic storage box device further includes a locking member configured to secure the lid in the closed state, wherein the locking member is configured to switch between a locked state and an unlocked state.

In one aspect, the electronic storage box device further comprises a motor for pivoting the lid, the motor is operably coupled to the locking member, wherein switching the locking member from the locked state to the unlocked state triggers the motor to open the lid.

In one aspect, the electronic storage box device further comprises a push button disposed on the housing or the lid, the push button is operably coupled to the locking member, wherein actuation of the push button causes the locking member to switch to the unlocked state.

In one aspect, the electronic storage box device further comprises a motion sensor configured to sense a gesture, the gesture is for unlocking the locking member.

In one aspect, the electronic storage box device further comprises one or more UV lights configured to irradiate the compartment.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
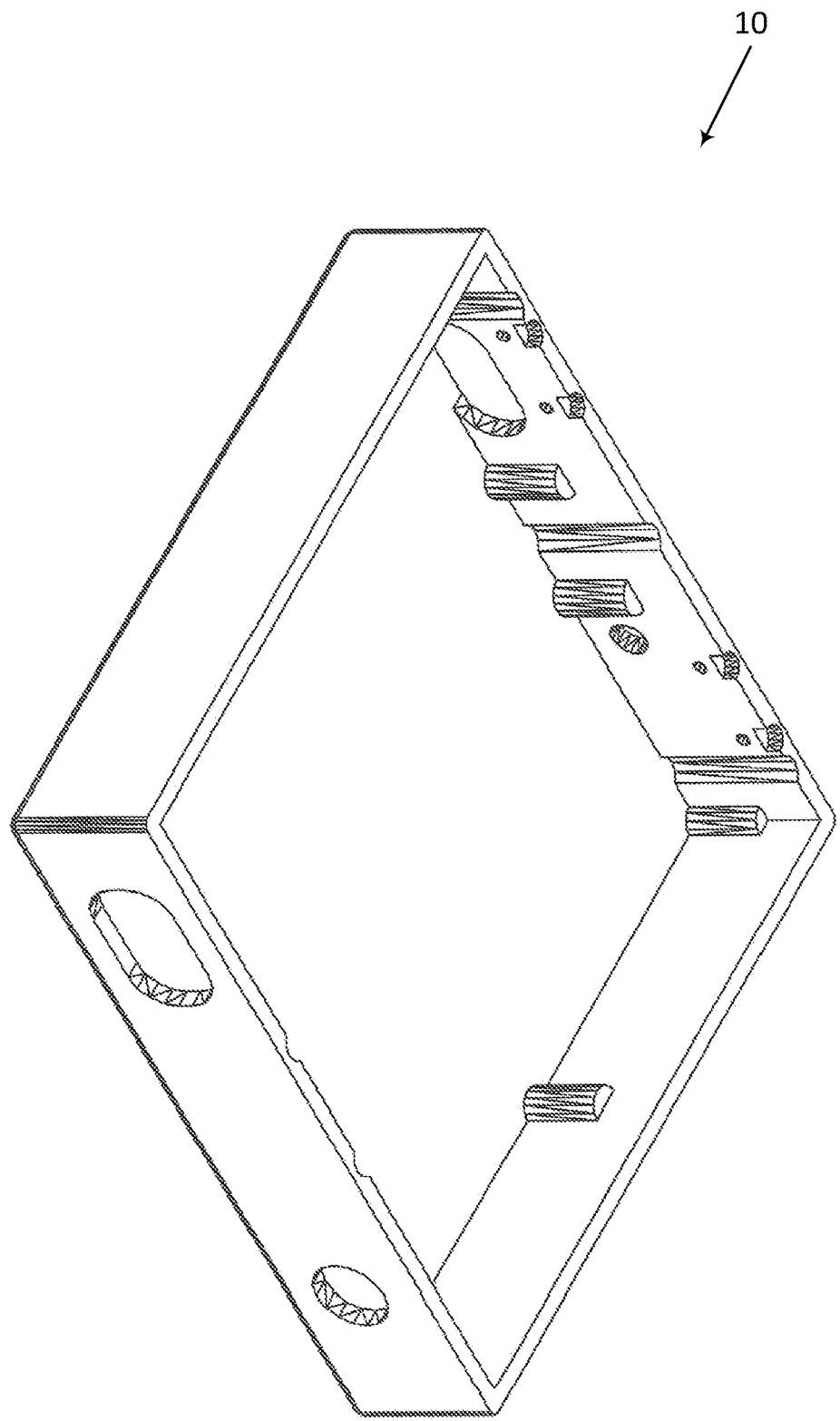
FIG. 1 is a perspective view of the housing, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

A portable and compact, dashboard mountable, electronic storage and multimedia box device is disclosed that can be used to store vehicle-related documents and other articles. The disclosed box device can be mounted over the dashboard such that the inside of the device can be accessible to the driver while the hands of the driver remain visible to a person standing outside the vehicle on the driver's side of the vehicle. The disclosed storage box device can also be accessible to a person standing outside the vehicle through the driver-side or passenger-side window of the vehicle. The disclosed storage box device can be placed on top of the dashboard of an automobile or any other location in an automobile that is accessible to the driver or a person from outside the vehicle through the window of the vehicle. The storage box device can include a singular storage compartment or multiple compartments formed by dividers. The size of the compartments can be varied by rearranging the dividers. The user can at least place the vehicle-related documents in the storage box device. When a police officer asks the driver of a vehicle for the documents and also asks the driver to place his hands so that they are visible to the officer, the officer can open the disclosed storage box through the window of the vehicle and retrieve the documents. Alternatively, the driver can open the storage box while the hands remain visible to the police officer. The disclosed storage box device can store a driver's license, concealed carry license, auto insurance card, auto registration, or other miscellaneous items.

Figure 2:
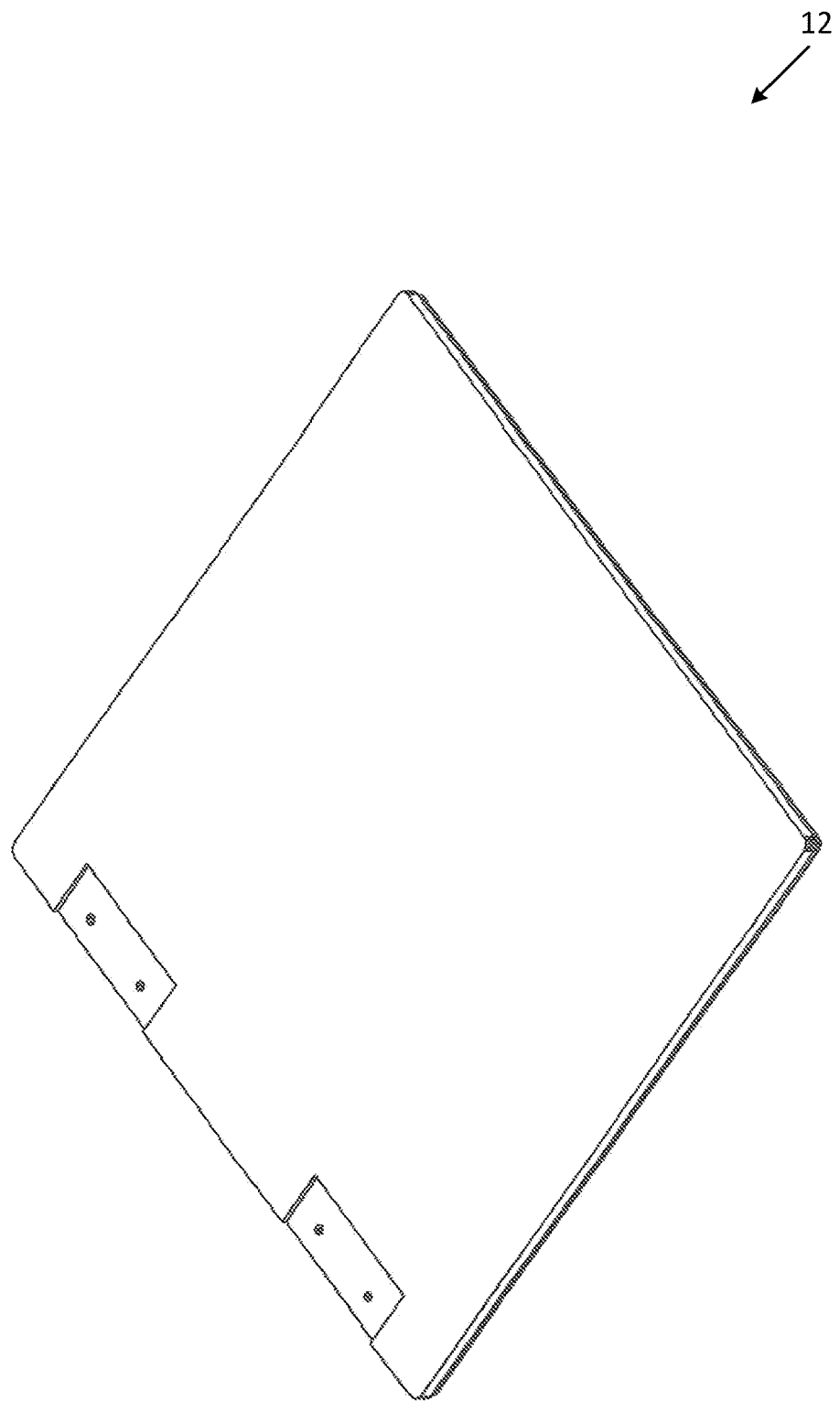
FIG. 2 is a perspective view of a lid, according to an exemplary embodiment of the present invention.
Figure 3:
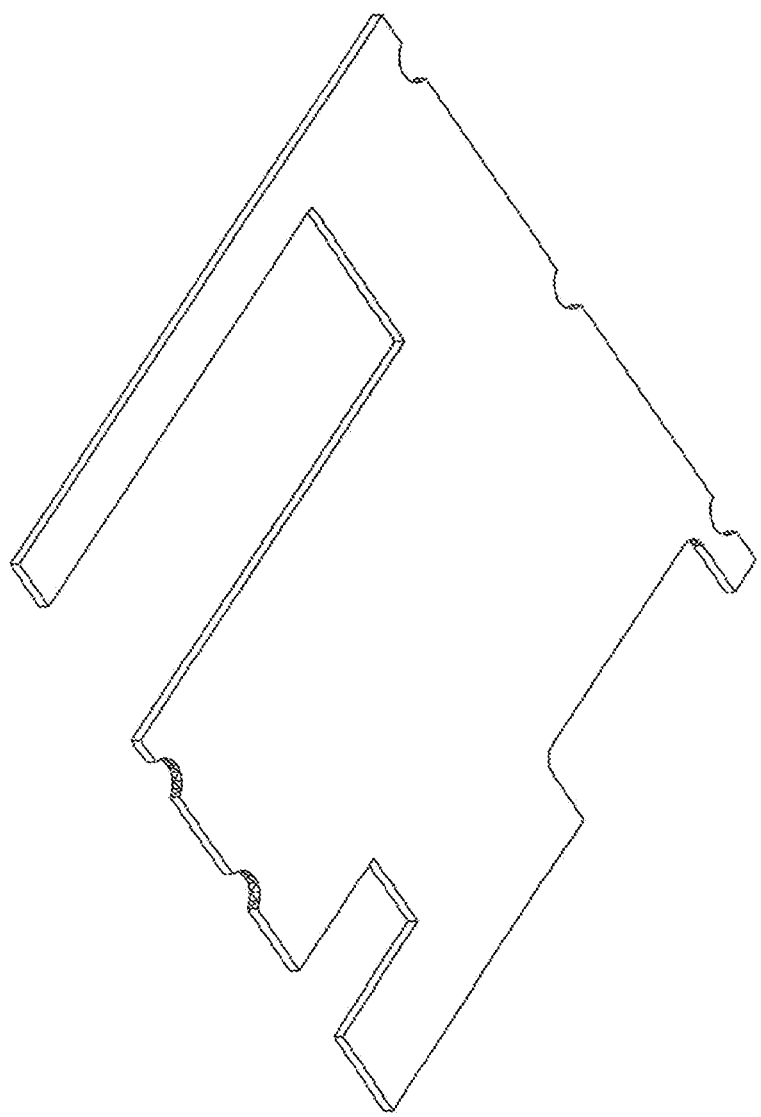
FIG. 3 shows an inner plate, according to an exemplary embodiment of the present invention.
Figure 4:
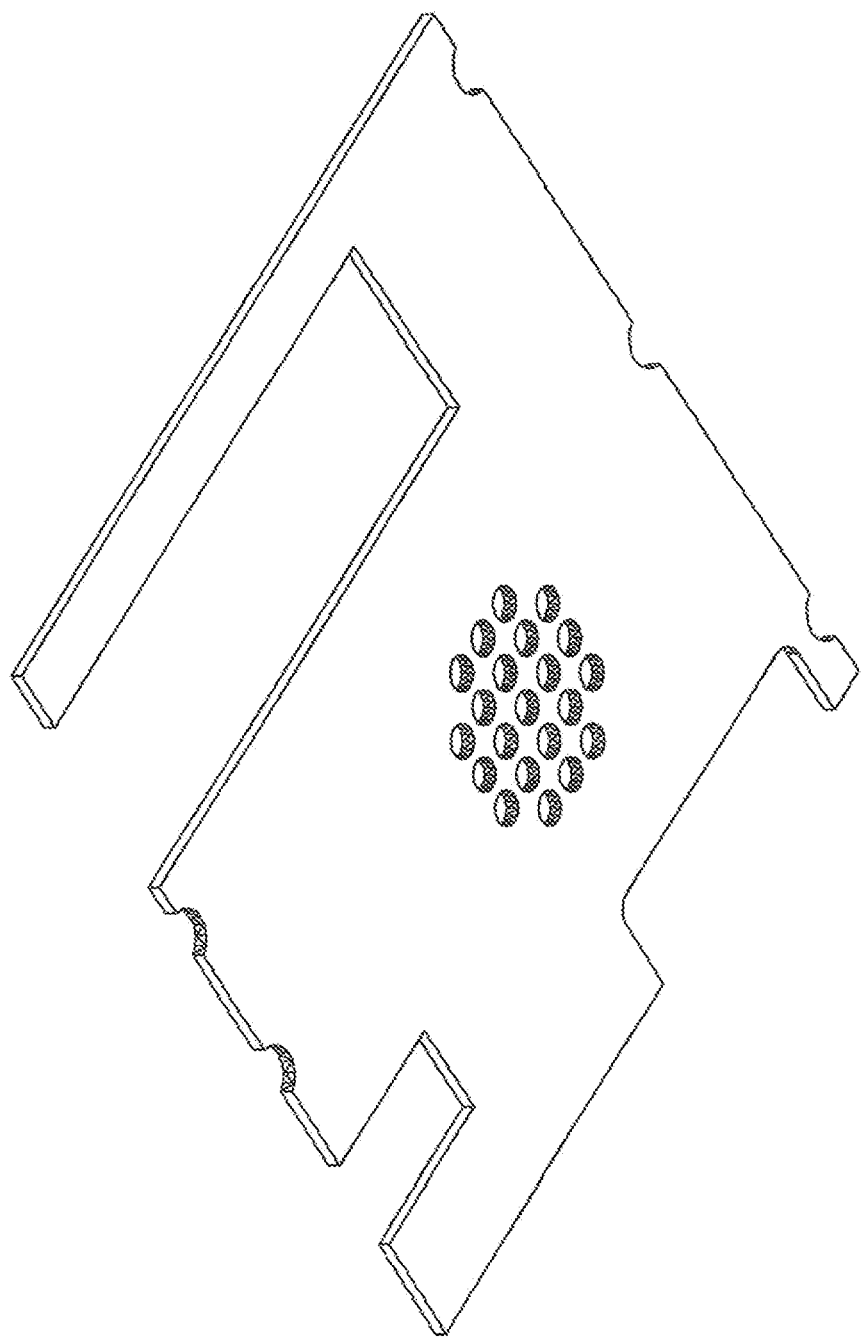
FIG. 4 shows another embodiment of the inner plate, according to the present invention.
Figure 5:
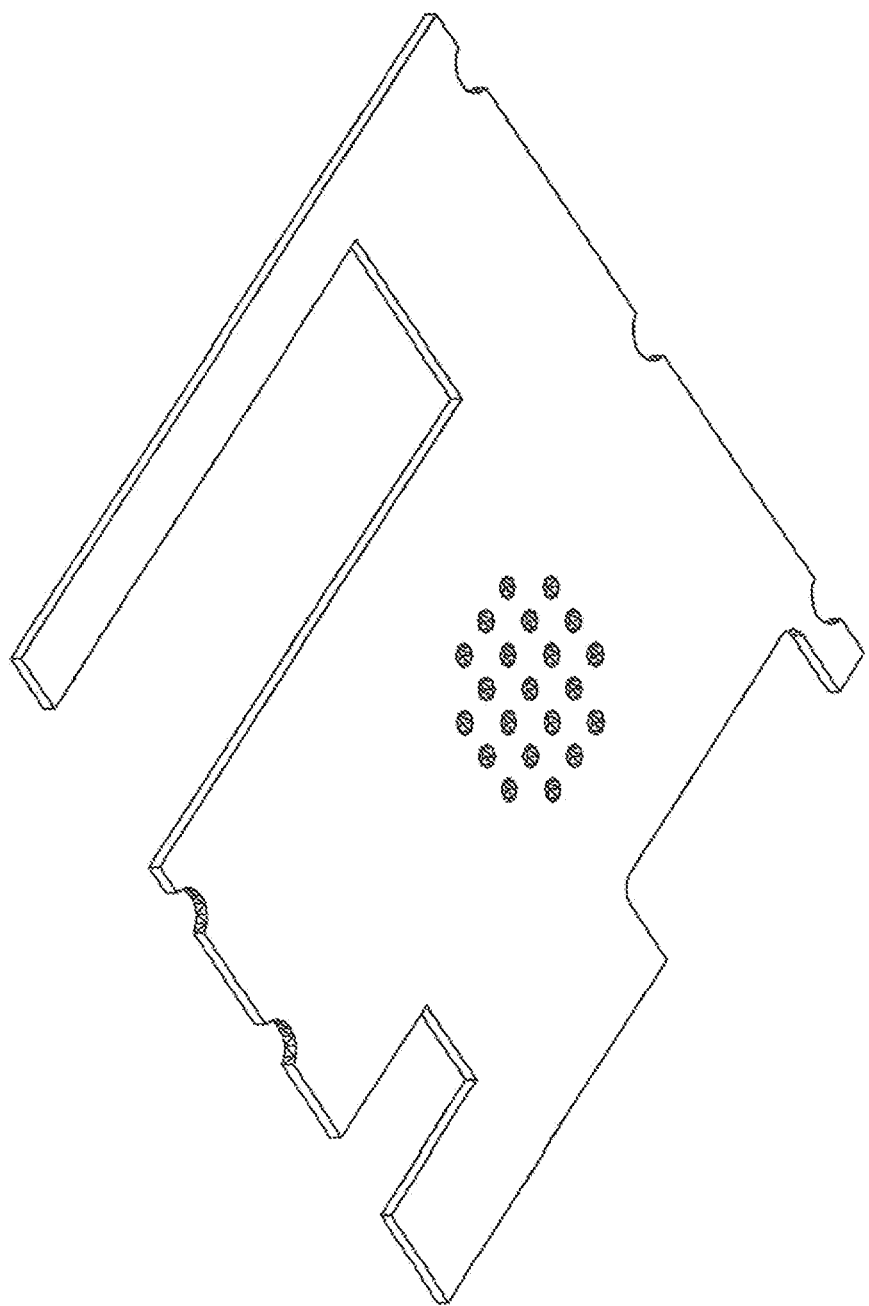
FIG. 5 shows another embodiment of the inner plate, according to the present invention.
Figure 6:
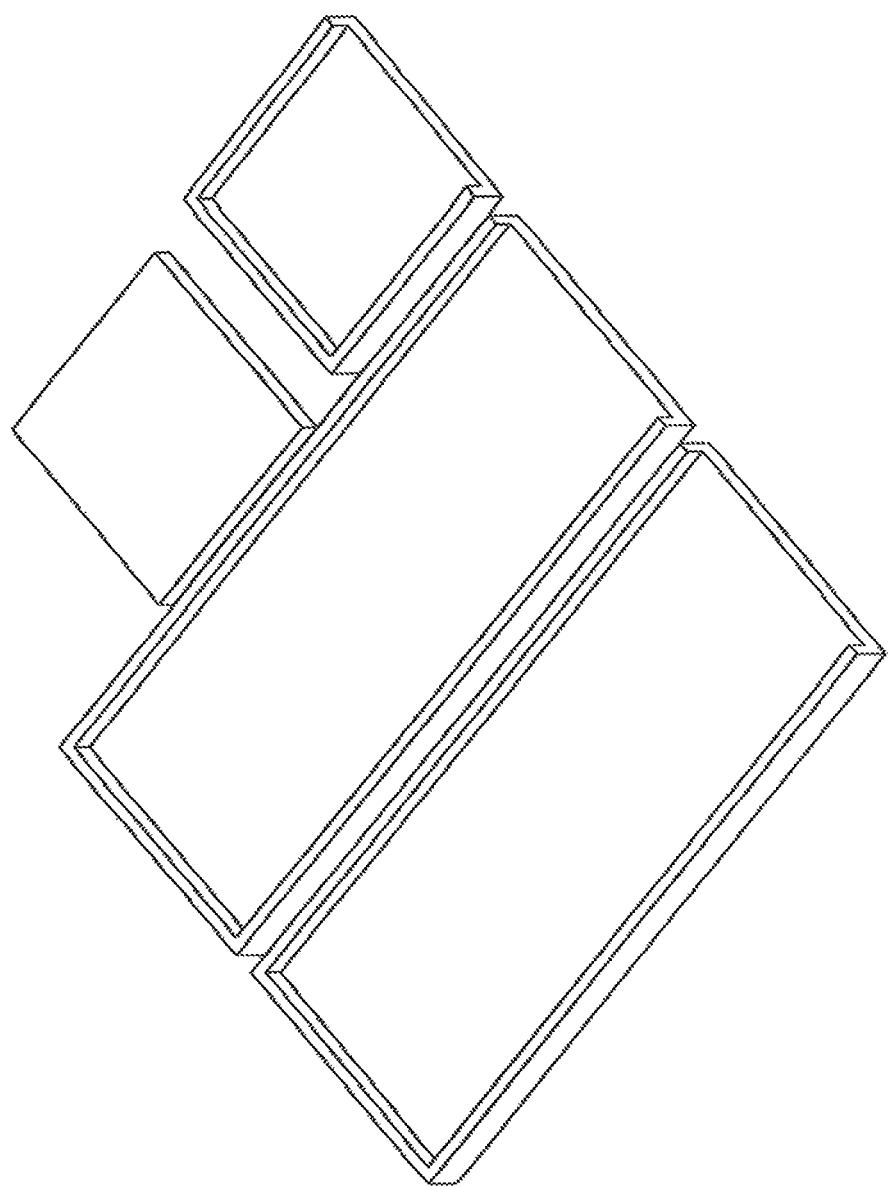
FIG. 6 shows the dividers for the storage compartment, according to an exemplary embodiment of the present invention.
Figure 7:
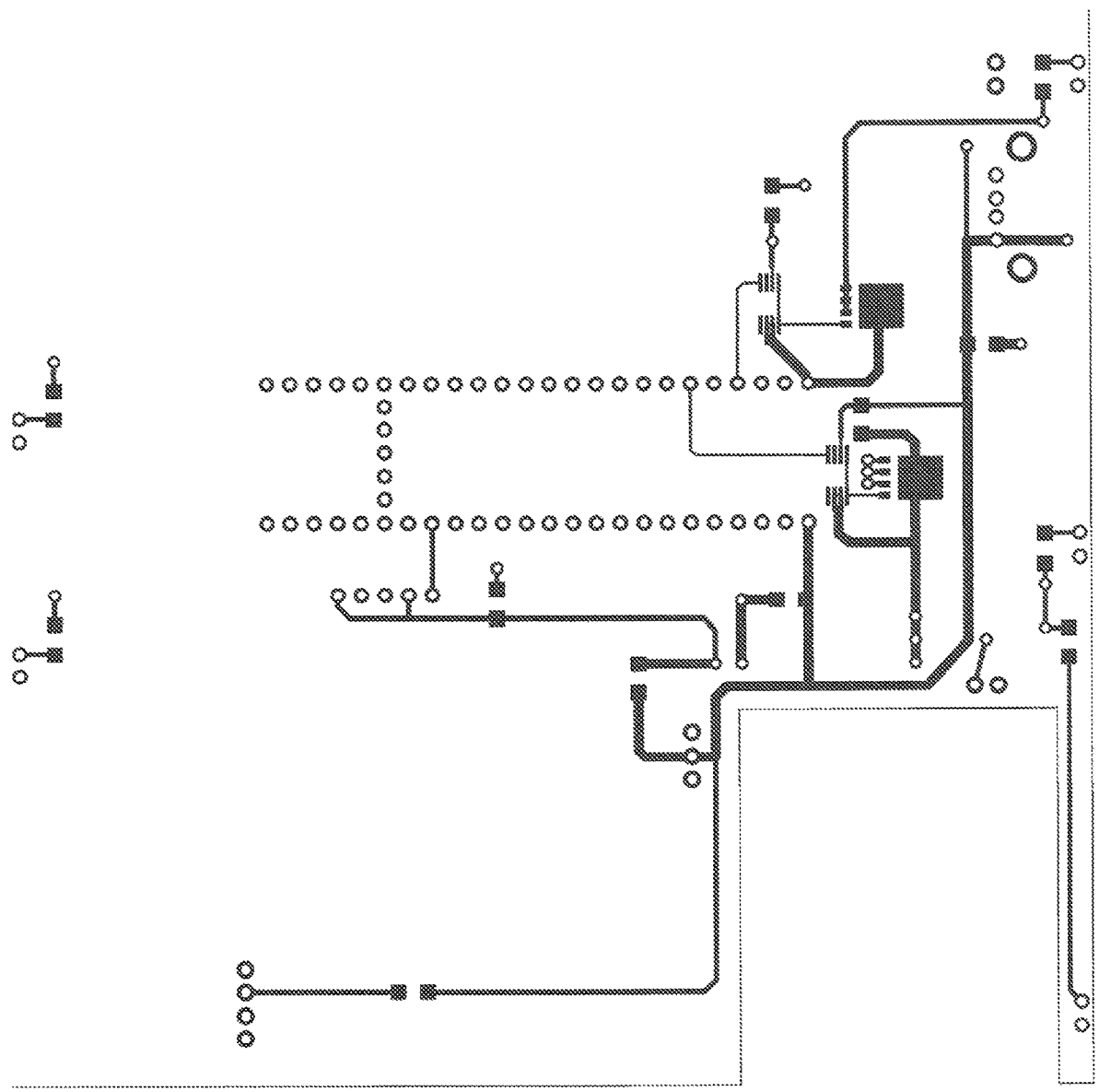
FIG. 7 illustrates a top layer of a printed circuit board, according to an exemplary embodiment of the present invention.
Figure 8:
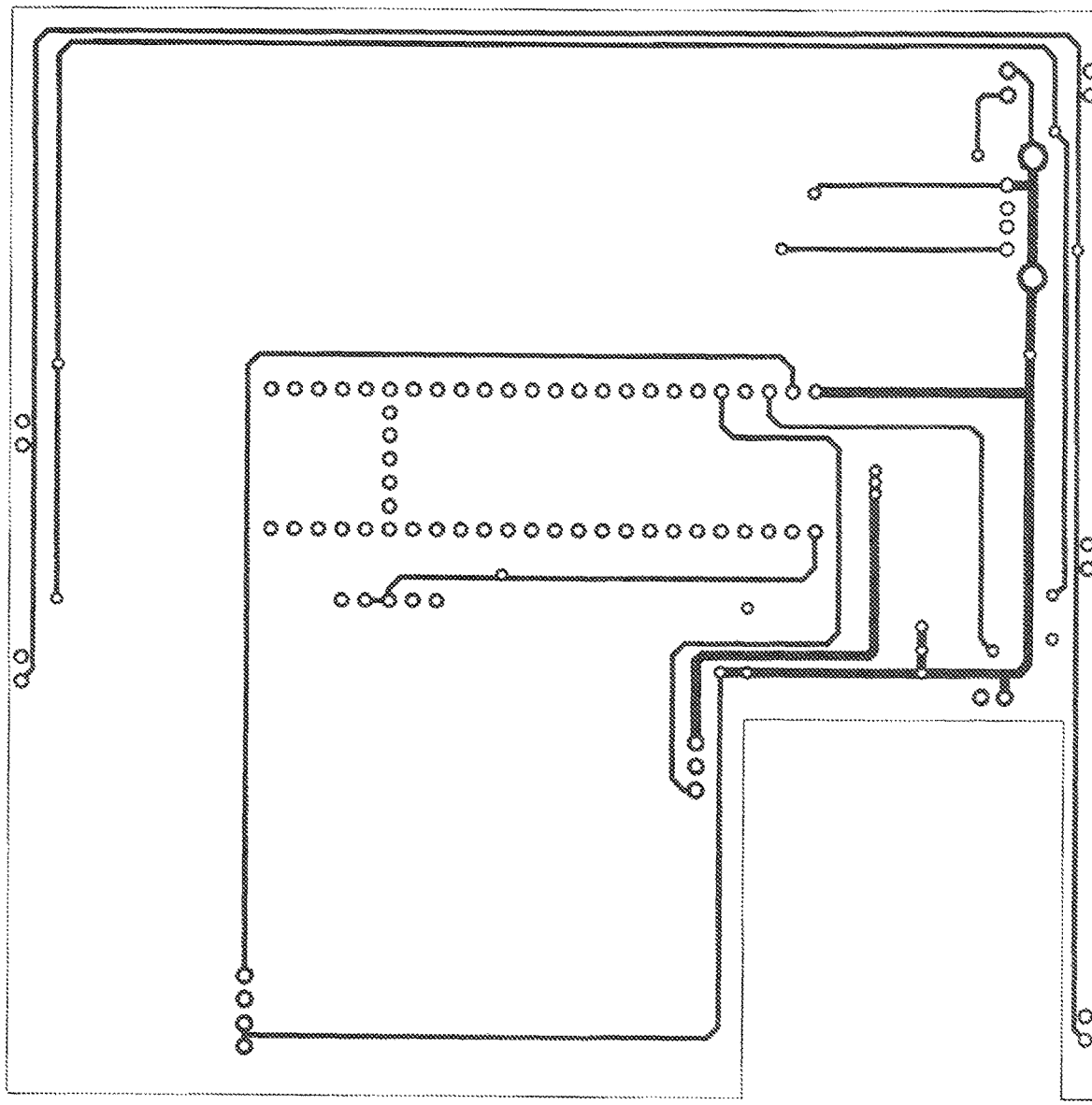
FIG. 8 shows a bottom layer of the printed circuit board, according to an exemplary embodiment of the present invention.
Figure 9:
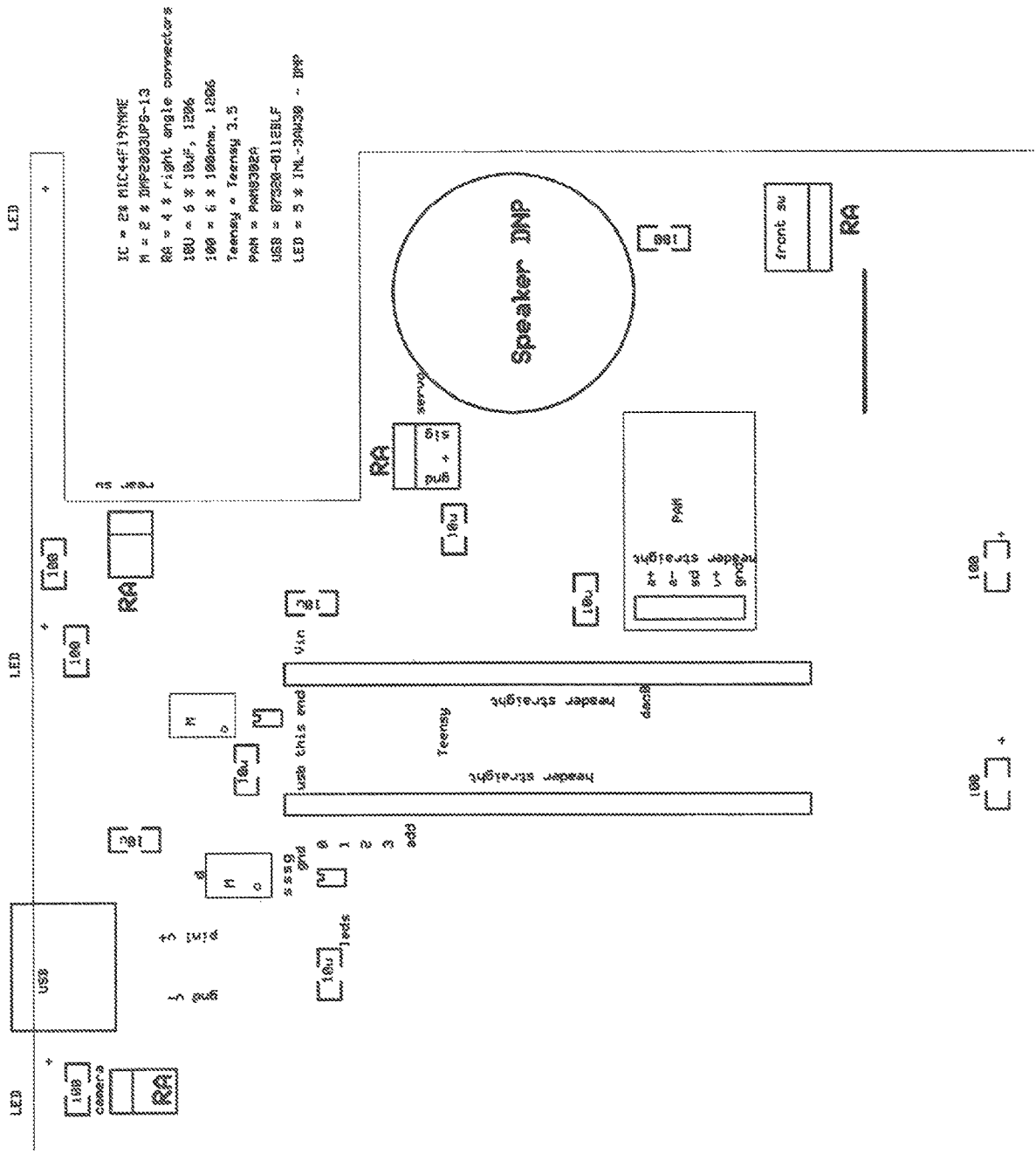
FIG. 9 shows a silk layer of the printed circuit board, according to an exemplary embodiment of the present invention.
Figure 10:
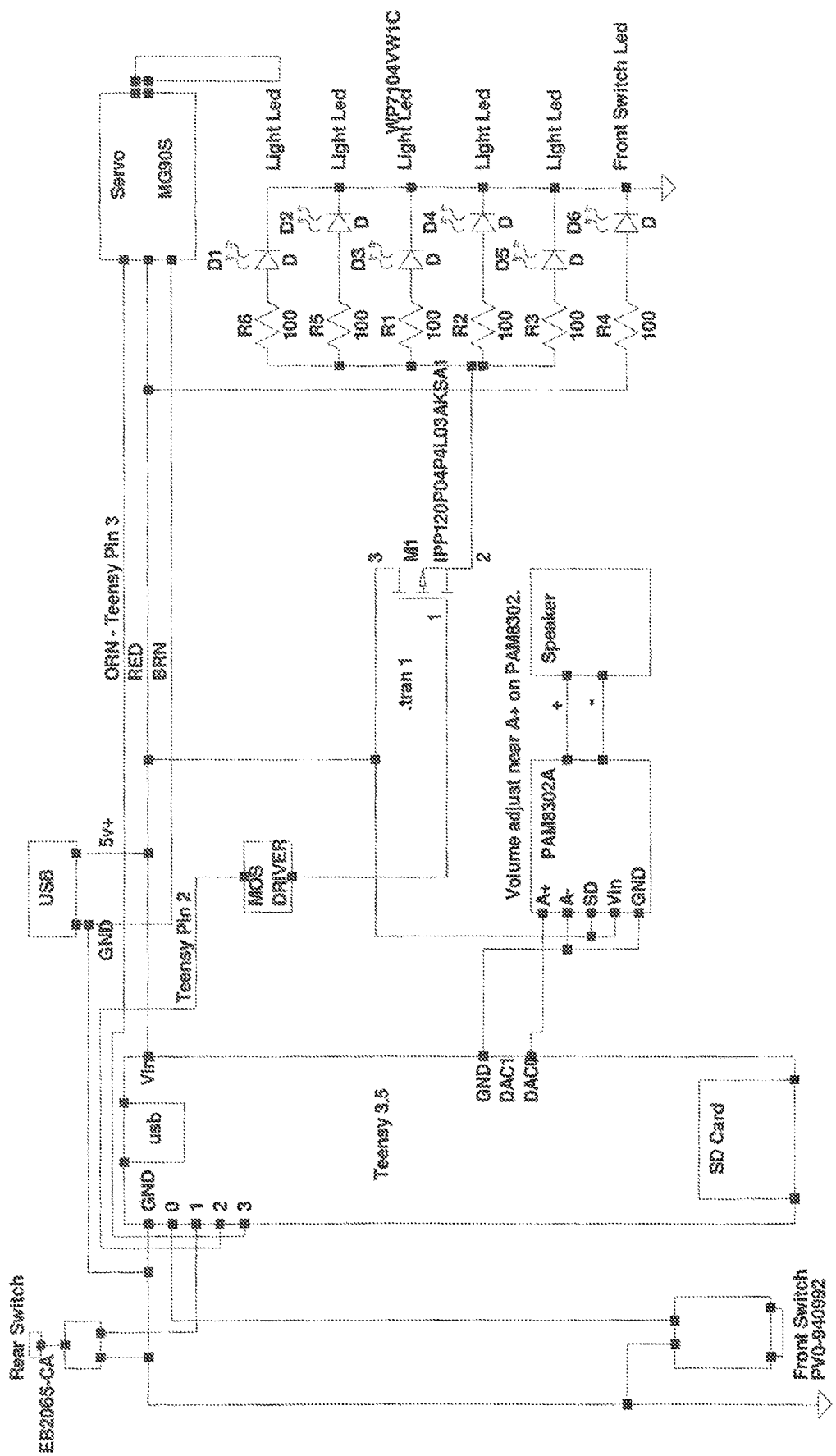
FIG. 10 is a circuit diagram of the device, according to an exemplary embodiment of the present invention.

The disclosed storage box device has a housing that includes a side wall and a base. FIG. 1 shows housing 10 that has the base and side wall. The top of the housing is open for gaining access to the interior of the housing. A lid closes the open top of the housing wherein the lid can pivot between an open state and a closed state. An example of lid 12 is shown in FIG. 2 The housing can include a storage compartment for storing articles. The housing can also include another compartment that encases different electronic components.

Figure 11:
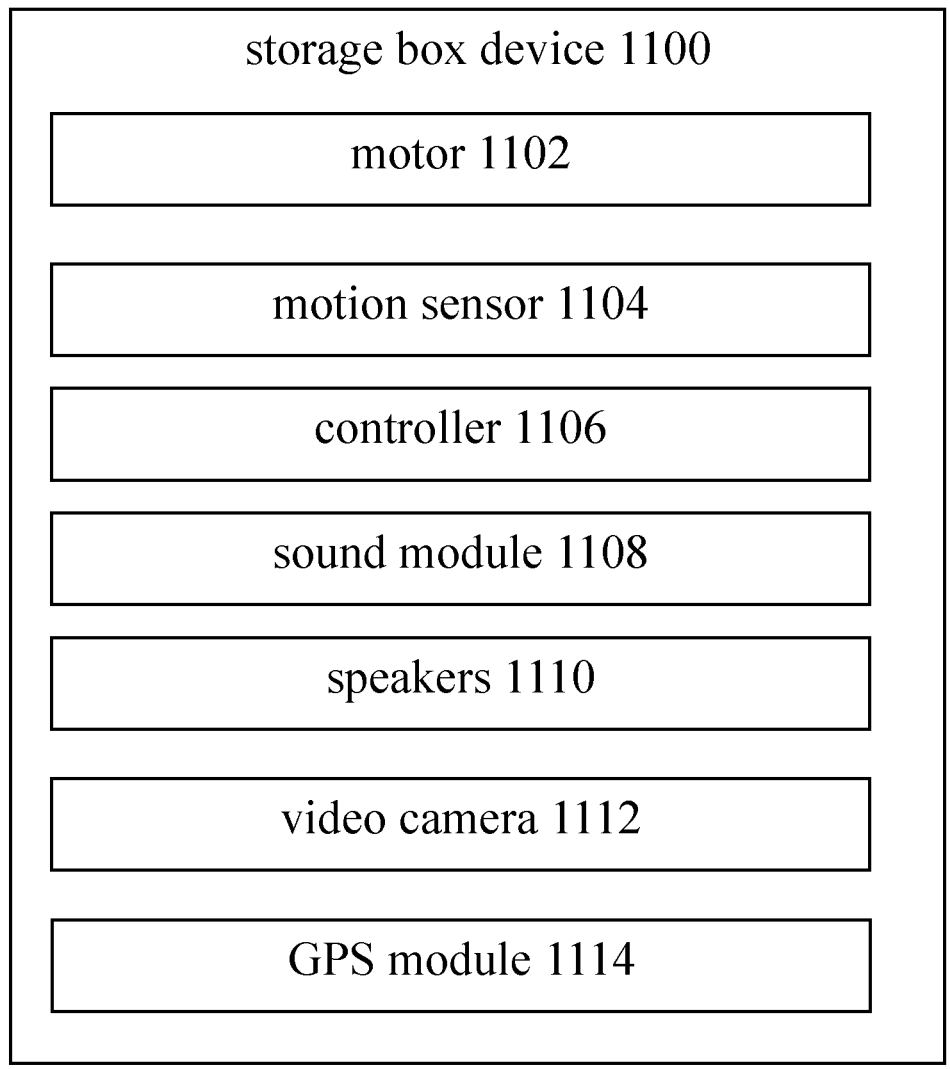
FIG. 11 is a block diagram showing the different components of the device, according to an exemplary embodiment of the present invention.

The lid can be coupled to the housing through a hinge joint, however, any other mechanism for mounting the lid is within the scope of the present invention. The lid can be locked in the closed state using any of the mechanisms, such as an eye hook or latch or push lock, all are manually operated. For the push lock, the lid can be pressed once to unlock the lock and open the lid. For closing the lid, the lid can be pressed against the housing or pressed again. The disclosed storage box can also include an electronic lock for securing the lid. For example, a touch-based interface can be used to unlock the lid, wherein the user has to tap on top of the lid. A voice-based unlock mechanism is also envisioned, wherein the driver can say a command to open the storage box. A button can also be mounted to a steering wheel that, upon actuation, opens the storage box. Motion sensors can also be used, where a gesture can open the box. The storage box device can also include a motor for opening the lid. Thus, a user just has to issue a command, and the lid can be opened automatically by the motor. FIG. 11 shows a motor 1102 and a motion sensor 1104 that can be incorporated into the storage box device 1100.

The disclosed storage box device can include a controller 1106 built onto a printed circuit board for managing different functions. FIGS. 7-10 show different implementations of the printed circuit board (PCB) and a circuit diagram of the disclosed device. The storage box device can include a sound module 1108, one or more speakers 1110, and a video camera 1112, etc.

In certain implementations, the disclosed device can be mounted to the dashboard using a suitable adhesive, such as double-sided tape. However, any other mechanism for securing the device to a dashboard or similar surface is within the scope of the present invention. For example, the bottom surface of the storage box can be provided with suction cups.

In certain implementations, the housing can be made from any material that is rigid and durable. For example, the materials can include plastics and metals. Preferably, the housing can be cuboid; however, any shape, color, and size of the housing are within the scope of the present invention. For example, the housing can be square-shaped. The size of the housing can be varied, and the user may be provided with different size options to choose from. To enhance the aesthetic appearance of the storage box, suitable designs can be applied to the housing. Any design, coating, layer, covering, and the like over the housing is within the scope of the present invention.

The disclosed storage box device can include a sound module and one or more speakers for recording and audio playback. Audio files, stored in internal or external memory, can be played by the sound module, for example, prayers, shofar trumpet blowing sounds, religious music and songs, music, and songs of all genres, meditation music, and spiritual music can be played by the disclosed device. Many of the audio files can be recorded on the internal memory of the disclosed storage box device. External memory cards containing the audio files can also be connected to the disclosed storage box, for example, SD memory cards, USB sticks, and the like can be connected. Also, external devices, such as smartphones, can connect to the disclosed storage box device through a wired or wireless connection. The external device can be used to control one or more functions or features of the disclosed device. For example, audio files on the smartphone can be played through the disclosed device. The smartphone can also be used to open and close the lid. Different controls for manipulating settings for audio playback can also be displayed on the external device. In one case, application software can be provided for the external device that allows the external device to receive input and interact with the disclosed device. The disclosed device can also include a GPS module to support various applications that may use GPS functionality. FIG. 11 shows GPS module 1114. For manual control, hard buttons can be provided on the outer surface of the housing or the lid. One or more speakers can be mounted to the housing.

Preferably, the recording on the internal memory of the disclosed device can include traffic stop protocols and procedures, law enforcement official's code of conduct, constitutional rights and civil rights, Miranda rights, legal codes, code of law, US laws code and statutes, etc.

The disclosed device can support a variety of features, including two-way live audio and video communications. Thus, the user can take and make calls, both audio and video, through the disclosed device. The disclosed device can connect through Wi-Fi, Bluetooth®, and the like to external devices wirelessly. The disclosed device may also support hotspot capabilities, such that different people in the vehicle can use their smartphone hotspot to connect to the disclosed device for internet connectivity. The user can perform one or more functions of their smartphone through the disclosed device, such as sending messages, viewing images, and playing audio and video, etc.

The use of pre-recorded prayer sounds, shofar trumpet sounds, and spiritual sounds is of particular advantage to the driver and passengers of the vehicle. Prayer improves one's attitude and helps to feel happy both mentally, spiritually, and socially. Prayer helps a person to be humble, sympathetic, and empathetic to others and less selfish. Prayer is one of the leading pastimes for self-reflection and gratitude. Prayer promotes virtuous behavior and personal character growth. Prayer brings one closer to themselves as well as the higher power they pray to. There have been studies conducted that have shown that prayer reduces ego, pride, hate, and arrogance and promotes humility, wisdom, love, kindness, respect, integrity, unity, protection, peace, and positivity. Prayer makes one more concerned for the greater good rather than just themselves, improving selflessness. Prayer helps relieve stress, anxiety, depression, and fear in initial situations leaving the problems up to a higher being. Prayer positively changes mood and stress levels, giving one a positive outlook on life. Prayer helps a person to make good decisions. This can greatly help reduce stress, anxiety, tension, and fear between the officer and driver. Moreover, the driving behavior of the drivers and behavior of the passengers towards each other can be greatly improved.

The disclosed device can also include a video camera for the security of the vehicle and video conferencing. The camera may support night vision and motion detection to detect any intrusion in the vehicle, and upon detecting any intrusion, the disclosed device can send an alert to a predefined person or device. The video camera can be controlled by the disclosed device, wherein the disclosed device may allow operating the camera through an external computing device, such as a smartphone. The camera can be a wide-angle camera which allows a single camera to cover the entire interior of the vehicle; however, more than one camera is within the scope of the present invention.

The disclosed device can be powered by the power supply of the vehicle. For example, the disclosed device can be connected to any automobile power source outlet like a USB outlet, an automobile auxiliary power outlet, or any other power source outlet or connection mechanism, but can also be powered by computers, laptops, smartphones, electronic devices, etc. The disclosed device can also include batteries, preferably rechargeable batteries. While the disclosed device can be powered by the batteries, the batteries can be charged by the power supply of the vehicle. Alternatively, the batteries can provide power backup when the power supply of the vehicle is not available.

In certain implementations, the disclosed device can also include one or more lights to illuminate the interior of the device. The lights can be embedded within the walls or the lid of the disclosed device. The lights can also be provided outside the device for aesthetic purposes and to illuminate the interior of the vehicle. The lights can be LEDs lights that can be powered by the power source of the disclosed device. It is also envisioned that UV lights can also be provided in the interior of the housing, wherein the UV light can irradiate the items stored in the compartment for disinfection.

In certain implementations, the disclosed electronic storage device can be retrofitted or installed at the time of manufacturing. The electronic storage device can be mounted to the top of a dashboard of the vehicle, within the dashboard, on the side doors, seats, steering wheel, rearview mirror, and or any other automobile accessible location. The arrangement of different components, such as sound module and speaker for recording and playing sound, prayer sounds, shofar trumpet sounds, spiritual music sounds, video camera, open and close electronically and mechanically with a switch or by other open and closing mechanism like motion sensor and or manually open and closing, inside interior space for storing traffic stop requested items and or miscellaneous items, with organization dividers or without organization dividers, LED lights for night visualization, ultraviolet LED lights for sanitation purposes, etc., can vary between a model to be retrofitted and a model installed at the time of manufacturing, and any such variations is within the scope of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for storing articles and documents in a vehicle, the method comprising:
   providing an electronic storage box device comprising:
   a housing having a side wall, a base, and an open top,
   a lid coupled to the housing and configured to close the open top, the lid configured to switch between an open state and a closed state,
   a first compartment within the housing and configured to store at least documents related to the vehicle,
   a GPS module,
   a camera supporting night vision and motion detection to detect any intrusion in the vehicle, wherein videos from the camera are stored in an external storage, and
   a second compartment encasing electronic components of the electronic storage box device,
   a playback module configured to play audio files, the playback module disposed within the housing, the playback module comprises pre-recorded prayer sounds, shofar trumpet sounds, and spiritual sounds,
   a first plate having no holes,
   a second plate having a plurality of holes of first size,
   a third plate having a plurality of holes of a second size, wherein the first size is different from the second size, wherein the housing is configured to interchangeably receive at least one of the first plate, the second plate, and the third plate for separating the first compartment and the second compartment,
   one or more speakers mounted in the second compartment housing, the one or more speakers operably coupled to the playback module;
   mounting the electronic storage box device on a top of a dashboard of the vehicle near a passenger side window of the vehicle so that the electronic storage box device is accessible by a person from outside of the vehicle through the passenger side window, wherein the electronic storage box device is retrofitted or installed at a time of manufacturing as a non-portable fixture;
   storing the at least documents related to the vehicle in the first compartment, the at least document comprises a driving license, auto insurance card, and auto registration document;
   opening the lid from outside the vehicle through the passenger side window to take out at least the driving license, auto insurance card, and auto registration document;
   playing the pre-recorded prayer sounds, shofar trumpet sounds, and spiritual sounds to improve driving behavior of a driver and behavior of passengers towards each other, changes mood and stress levels, and to reduce stress, anxiety, tension, and fear between a police officer and the driver.

2. The method according to claim 1, wherein the electronic storage box device further comprises:
   one or more UV lights configured to irradiate the first compartment and the items contained in the first compartment.

3. The method of claim 1, wherein the electronic storage box device is configured to be placed anywhere in the vehicle, the anywhere comprises side door panel.

4. The method according to claim 1, wherein the electronic storage box device further comprises:
   a locking member configured to secure the lid in the closed state, wherein the locking member is configured to switch between a locked state and an unlocked state.

5. The method according to claim 4, wherein the electronic storage box device further comprises:
   a motion sensor configured to sense a gesture, the gesture is for unlocking the locking member.

6. The method according to claim 4, wherein the electronic storage box device further comprises:
   a motor for pivoting the lid, the motor is operably coupled to the locking member, wherein switching the locking member from the locked state to the unlocked state triggers the motor to open the lid, wherein locking member is configured to be operated by a smartphone causing the opening of lid, the smartphone connected to the electronic storage box device through a wireless connection.

7. The method according to claim 6, wherein the electronic storage box device further comprises:
   a push button disposed on the housing or the lid, the push button is operably coupled to the locking member, wherein actuation of the push button causes the locking member to switch to the unlocked state, wherein the pressing the push button causes the motor to lift the lid.

8. An electronic storage box device for storing articles and documents in a vehicle, the electronic storage box device is retrofitted or installed at a time of manufacturing as a non-portable fixture, the electronic storage box device comprises:
   a housing having a side wall, a base, and an open top;
   a lid coupled to the housing and configured to close the open top, the lid configured to switch between an open state and a closed state, wherein lights are disposed in the lid and side wall, wherein the light is configured for night visualization;
   a first compartment within the housing configured to store at least documents related to the vehicle;
   a GPS module;
   a second compartment encasing electronic components of the electronic storage box device;
   a video camera for security of the vehicle and video conferencing, wherein the electronic storage box device is configured to permit operating the video camera through an external computing device;
   a memory, wherein the memory stores traffic stops protocols and procedures, law enforcement official's code of conduct, constitutional rights and civil rights, Miranda rights, legal codes, code of law, US laws code and statutes, pre-recorded prayer sounds, shofar trumpet sounds, and spiritual sounds;
   a playback module configured to play audio files, the playback module disposed within the housing, the playback module comprises pre-recorded prayer sounds, shofar trumpet sounds, and spiritual sounds;
   a first plate having no holes;
   a second plate having a plurality of holes of first size;
   a third plate having a plurality of holes of a second size, wherein the first size is different from the second size, wherein the housing is configured to interchangeably receive at least one of the first plate, the second plate, and the third plate for separating the first compartment and the second compartment;
   one or more speakers mounted in the second compartment housing, the one or more speakers operably coupled to the playback module, wherein electronic storage box device supports two-way live audio and video communications with calling facility, wherein the electronic storage box device is configured to wireless connect to external electronic devices.

9. The electronic storage box device according to claim 8, wherein the electronic storage box device further comprises:

a playback module configured to play audio files, the playback module disposed within the housing; and one or more speakers mounted in the housing, the one or more speakers operably coupled to the playback module, wherein the playback module is configured to play the pre-recorded prayer sounds, shofar trumpet sounds, and spiritual sounds.

10. The electronic storage box device according to claim 8, wherein the electronic storage box device further comprises:

one or more UV lights configured to irradiate the first compartment.

11. The electronic storage box device according to claim 8, wherein the lid can be manually opened.

12. The electronic storage box device according to claim 8, wherein the electronic storage box device further comprises:

a locking member configured to secure the lid in the closed state, wherein the locking member is configured to switch between a locked state and an unlocked state.

13. The electronic storage box device according to claim 12, wherein the electronic storage box device further comprises:

a motor for pivoting the lid, the motor is operably coupled to the locking member, wherein switching the locking member from the locked state to the unlocked state triggers the motor to open the lid.

14. The electronic storage box device according to claim 12, wherein the electronic storage box device further comprises:

a push button disposed on the housing or the lid, the push button is operably coupled to the locking member, wherein actuation of the push button causes the locking member to switch to the unlocked state.

15. The electronic storage box device according to claim 12, wherein the electronic storage box device further comprises:

a motion sensor configured to sense a gesture, the gesture is for unlocking the locking member.

* * * * *